UNITED STATES PATENT OFFICE.

CHARLES NOLL, OF CLEVELAND, OHIO, ASSIGNOR OF ONE-THIRD TO IRWIN A. READER AND ONE-THIRD TO EDWARD C. READER, BOTH OF CLEVELAND, OHIO.

PLASTIC COMPOSITION.

1,393,814. Specification of Letters Patent. Patented Oct. 18, 1921.

No Drawing. Application filed October 31, 1919. Serial No. 334,872.

*To all whom it may concern:*

Be it known that I, CHARLES NOLL, a citizen of the United States, residing at Cleveland, in the county of Cuyahoga and State of Ohio, have invented a certain new and useful Improvement in Plastic Composition, of which the following is a full, clear, and exact description.

This invention relates to compositions such as are employed for the purpose of plastering walls, ceilings or similar surfaces, and has for its general objects to provide a composition which, when mixed in the usual manner with water or other liquid, will adhere firmly to the majority of the surfaces to which it may be applied; which can be applied as a relatively thick coating and will not crack during the drying or setting operation; which is cheap of production; which requires a minimum time for setting; which is particularly easy to work; which will not deteriorate after mixing with liquid; which can be shipped and stored in the dry state without special precautions to protect the same against moisture; and which, while in a moist condition, is capable of receiving a finishing coat of any suitable material as for example that disclosed in my Patent No. 1,239,032 of September 4, 1917. Further objects and advantages of the invention will be set forth hereinafter in connection with the detailed description.

In preparing my composition I mix together dry, pulverized slaked lime and yellow clay, together with dry screened silica sand and ground blast furnace slag, or sharp bank sand, in about the following proportions by weight:—

| | Parts. |
|---|---|
| Slaked lime | 20 |
| Yellow clay | 15 |
| Silica sand | 40 |
| Blast furnace slag or sharp bank sand | 25 |

When the blast furnace slag is used, it is preferable to employ the same in particles no smaller than 22 mesh.

This mixture, being dry and free from lumps, may be shipped in bags or other containers and requires the addition thereto of sufficient water (or other liquid) to produce a plaster of the desired plasticity.

The silica sand (containing about 98% silica) coöperates with the other ingredients to prevent chipping. The blast furnace slag or sharp bank sand coöperates with the other ingredients not only to form a binder but tends to hasten the "setting" of the plaster because of its porosity. The plaster produced by my compound is capable of being applied in any thickness desired and thereby readily adapts itself to uneven surfaces to form a flat plane surface. One of its most valuable properties is its ability to adhere and dry quickly, as for example on a surface composed of tile or brick. This composition is intended primarily as a base coat for substances such as brick and tile, and where a smooth finished surface is desirable, a finishing plaster is applied as a second or finishing coat, such as the plaster disclosed in my Patent No. 1,239,032, dated September 4, 1917. In plastering surfaces such as concrete, it is desirable to apply a binding coating in advance of the application of this base coating. For such binding coating and the finishing coating, the composition of my Patent No. 1,239,032 is particularly well adapted.

Should the mortar produced by mixing my composition with liquid dry out, there will be no deterioration, and it may be used by adding sufficient liquid to bring it again to the desired plastic condition. This immunity from injury by moisture enables me to ship my composition in any ordinary non-waterproof container and the consignee to store the same without providing a special waterproof building therefor.

Having thus described my invention, what I claim is:

1. A composition for making plaster containing slaked lime, clay, sand, and a porous material, which may be again rendered plastic by the addition of liquid after having once been set.

2. A composition for making plaster, containing slaked lime, clay, blast furnace slag, and a preponderance of sand.

3. A composition for making plaster containing substantially the following proportions by weight:

| | Parts. |
|---|---|
| Dry slaked lime | 20 |
| Dry yellow clay | 15 |
| Dry silica sand | 40 |
| Dry blast furnace slag | 25 |

4. A plaster containing slaked lime, yellow clay, silica sand and blast furnace slag rendered plastic by admixture with liquid.

In testimony whereof, I hereunto affix my signature.

CHARLES NOLL.